Patented May 9, 1933

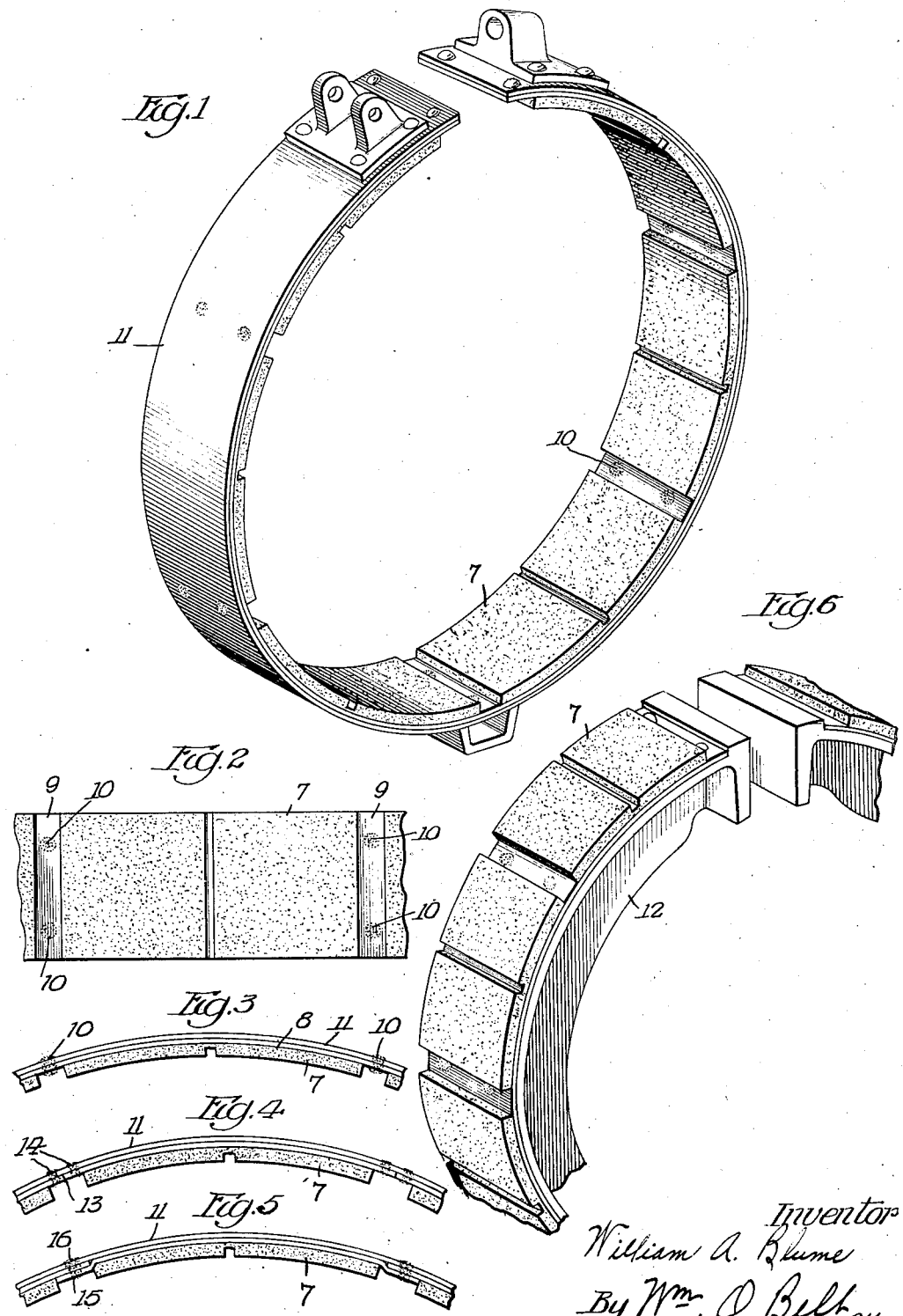

1,907,483

UNITED STATES PATENT OFFICE

WILLIAM A. BLUME, OF DETROIT, MICHIGAN, ASSIGNOR TO AMERICAN BRAKEBLOK CORPORATION, OF NEW YORK, N. Y., A CORPORATION OF NEW YORK

FRICTION BRAKE

Application filed November 9, 1928. Serial No. 318,211.

This invention relates to friction brakes and has particular reference to means for mounting the blocks on the band of an external brake or on the shoe or head of an internal brake, or on other supports in friction brakes of different varieties.

The primary object of the invention is to provide a simple and secure anchorage for the block on the support, which can be easily and quickly applied without especial skill to secure the block to the support in a manner which will resist all usual conditions of service.

In the accompanying drawing I have illustrated selected embodiments of the invention and referring thereto:

Fig. 1 is a perspective view of a brake band with my invention applied thereto.

Fig. 2 is a plan view of a portion of the band shown in Fig. 1.

Fig. 3 is an edge view of a portion of the band shown in Fig. 1.

Figs. 4 and 5 are edge views illustrating other forms of the invention; and

Fig. 6 is a perspective view showing the invention applied to a shoe or head for an internal brake.

Referring to the drawing the block comprises a composition body 7 mounted on the metal back 8 the ends of which project at 9 beyond the ends of the body. The block is mounted on a support in the usual manner and is secured thereto by spot welding at 10 the projecting ends of the back to the band 11 or to the head 12 or to any other support. The block may be made in continuous strip form as shown in Figs. 1, 2, 3 and 6 and it may be made in unit form as shown in Figs. 4 and 5. The ends of the backs of unit blocks may be arranged to abut as at 13 Fig. 4, in which case both ends would be spot welded at 14 to the band 11 or other support. Or the projecting ends of the backs of unit blocks may be overlapped as at 15 Fig. 5, in which case these projecting ends would be spot welded to each other and to the band 11 or other support as indicated in 16, Fig. 5. The invention provides a simple and efficient means for easily, and rigidly securing one or more brake blocks on a band, a shoe, a head or other support in friction brakes of different varieties. The spot welding provides an efficient means for securing the block to the support in a manner which will resist the conditions of service and maintain the block in fixed position on the support. I have shown the invention in a selected embodiment in the drawing but I reserve the right to make all such changes therein and to use the invention in any other embodiment within the scope of the following claim.

I claim:

As a new article of manufacture, a friction brake comprising a support, a brake member including a plurality of unit blocks each comprising a block of composition material and having a metal back projecting beyond the ends of the block of composition material, said unit blocks being arranged in endwise arrangement on said support and having the projecting ends of the metal backs of alternate of said unit blocks offset to overlap the projecting ends of the metal backs of the unit blocks intermediate said alternate unit blocks, the overlapped ends of said unit blocks being spot welded to each other and to said support inwardly of the side edges of the overlapped ends and at points spaced from each other whereby said brake member and support are joined into a unit structure.

WILLIAM A. BLUME.